(12) United States Patent
Hartford (10) Patent No.: US 9,247,098 B2
(45) Date of Patent: Jan. 26, 2016

(54) AUTOMATIC TIME LAPSE CAPTURE (71) Applicant: Navteq B.V., Veldhoven (NL)

(72) Inventor: Stephen Andrew Hartford, San Jose, CA (US)

(73) Assignee: HERE Global B.V., Veldhoven (NL)

( * ) Notice: Subject to any disclaimer, the term of this patent is extended or adjusted under 35 U.S.C. 154(b) by 169 days.

(21) Appl. No.: 13/859,277

(22) Filed: Apr. 9, 2013

(65) Prior Publication Data

US 2014/0300769 A1  Oct. 9, 2014

(51) Int. Cl.
*H04N 1/21* (2006.01)
*H04N 5/232* (2006.01)

(52) U.S. Cl.
CPC ......... *H04N 1/2133* (2013.01); *H04N 5/23203* (2013.01); *G08C 2201/91* (2013.01); *H04N 2201/0084* (2013.01)

(58) Field of Classification Search
CPC . H04N 1/2133; H04N 1/215; H04N 5/23203; G08C 2201/91
USPC .......... 348/222.1, 239; 386/226, 322
See application file for complete search history.

(56) References Cited

U.S. PATENT DOCUMENTS

| 6,885,395 | B1 | 4/2005 | Rabbani et al. | |
|---|---|---|---|---|
| 6,904,184 | B1* | 6/2005 | Taylor | 382/294 |
| 7,015,949 | B1 | 3/2006 | Sah | |
| 2003/0202777 | A1 | 10/2003 | Kogusuri | |
| 2004/0075750 | A1 | 4/2004 | Bateman | |
| 2009/0237502 | A1 | 9/2009 | Maiya | |
| 2011/0279691 | A1 | 11/2011 | Ishii et al. | |
| 2012/0148216 | A1 | 6/2012 | Pavagada et al. | |
| 2012/0242853 | A1 | 9/2012 | Jasinski et al. | |
| 2012/0257071 | A1 | 10/2012 | Prentice | |
| 2014/0300759 | A1* | 10/2014 | Lachapelle | 348/207.1 |

FOREIGN PATENT DOCUMENTS

EP    2249557 A1    11/2010

OTHER PUBLICATIONS

International Search Report and Written Opinion cited in PCT/EP2014/056915, mailed Jun. 30, 2014.

* cited by examiner

*Primary Examiner* — Paul Berardesca
(74) *Attorney, Agent, or Firm* — Lempia Summerfield Katz LLC (57) ABSTRACT In one embodiment, a mobile device captures images at a rate different than playback speed. The mobile device receives a user input to initiate a collection of image data by a mobile device. A timer is incremented in response to the collection of image data or in response to the user input. The mobile device compares an elapsed time of the timer to a threshold. The image data is captured at a first frame rate until the elapsed time reaches the threshold and at a second frame rate when the timer exceeds the threshold. A series of thresholds may be used.

19 Claims, 7 Drawing Sheets

AUTOMATIC TIME LAPSE CAPTURE

FIELD

The following disclosure relates to the automatic setting of a frame rate for time lapse image capture.

BACKGROUND

Time lapse photography involves the playback of video or a sequence of images at a speed different than the rate at which the video or sequence of images was captured. Time lapse photography may involve a series of pictures taken one per day to illustrate a construction of a building or the aging of a person. Time lapse photography may involve a series of pictures taken one per minute to illustrate a sunrise or a sunset. These examples may require a user to press a capture button every minute or every day. Some cameras include a time lapse control setting but require the user to select the capture frame rate. The user must manually calculate the capture frame rate ahead of time, taking into account how often the subject matter changes, and the desired duration of the resulting video.

SUMMARY

In one embodiment, a mobile device captures images at a rate different than playback speed. The mobile device receives a user input to initiate a collection of image data by a mobile device. A timer is incremented in response to the collection of image data or in response to the user input. The mobile device compares an elapsed time of the timer to a threshold. The image data is captured at a first frame rate until the elapsed time reaches the threshold and at a second frame rate when the timer exceeds the threshold. A series of thresholds may be used.

BRIEF DESCRIPTION OF THE DRAWINGS

Exemplary embodiments of the present invention are described herein with reference to the following drawings.

DETAILED DESCRIPTION

Time lapse photography is a sequence of images that are recorded at a different rate than the speed of playback. The playback of the time lapse photography may be slower or faster than the speed of the image capture. Time lapse photography may be used to more quickly show slow moving objects. For example, time lapse photography is well suited to depict a sunset, a sunrise, a tide of the ocean, a cloud pattern or other weather, building a sandcastle, or a plant growing. Time lapse photography may be used to more slowly show rapidly moving objects.

The speed of the time lapse photography may be defined by the ratio of the image capture speed to the playback speed. The speeds may be measured in frames per second. The playback speed may be a speed sufficient for movement of objects in the images to appear as fluid motion. The speed sufficient to appear as fluid motion may be 24 frames per second, 30 frames per second, or another value. The image capture speed may be any speed. If the image capture speed is greater than the playback speed, then the playback of the images appears to move in slow motion. If the image capture speed is less than the play back speed, then the playback of the images appears to move in fast motion. Examples for the image capture speed include 100 frames per second, 20 frames per second, 1 frame per second, 1/6 frames per second (10 frames per minute), 1/60 frames per second (1 frame per minute), or another speed.

In one example, the playback speed is constant and the image capture speed is selected to dictate the relative speed of playback. A user may select an image capture speed based on the desired playback time. For example, the user may estimate a duration of the action to be captured and estimate a duration for playback. The ratio of the estimate for the action duration to the estimate for the playback duration is equal to ratio of the action speed to the estimate of the playback speed. Assuming a constant action speed, the user calculates the image capture speed based on the ratio of the action duration to the estimate of the playback duration. For example, assuming a playback speed of 30 frames per second, an estimate playback duration of 45 seconds, and an estimate for the action duration of 15 minutes (900 seconds), the image capture speed may be calculated as 90 frames per minute (1.5 frames/second=45 seconds/900 seconds*30 frames per second). The user selects a time lapse mode for 90 frames per minute or the nearest setting to 90 frames per minute.

These estimations and calculations are difficult and burdensome on the user. The following embodiments include automatically selecting a frame rate for the image capture. The user provides an input to begin recording, such as depressing an image capture button. A frame rate for the image capture is initially set at a first speed comparable to the speed sufficient for fluid motion. If recording continues for a predetermined amount of time, the image capture slows to a second speed. Additional time intervals may be used. For example, if recording continues for another predetermined amount of time, the image capture slows to a third speed.

Figure 1:
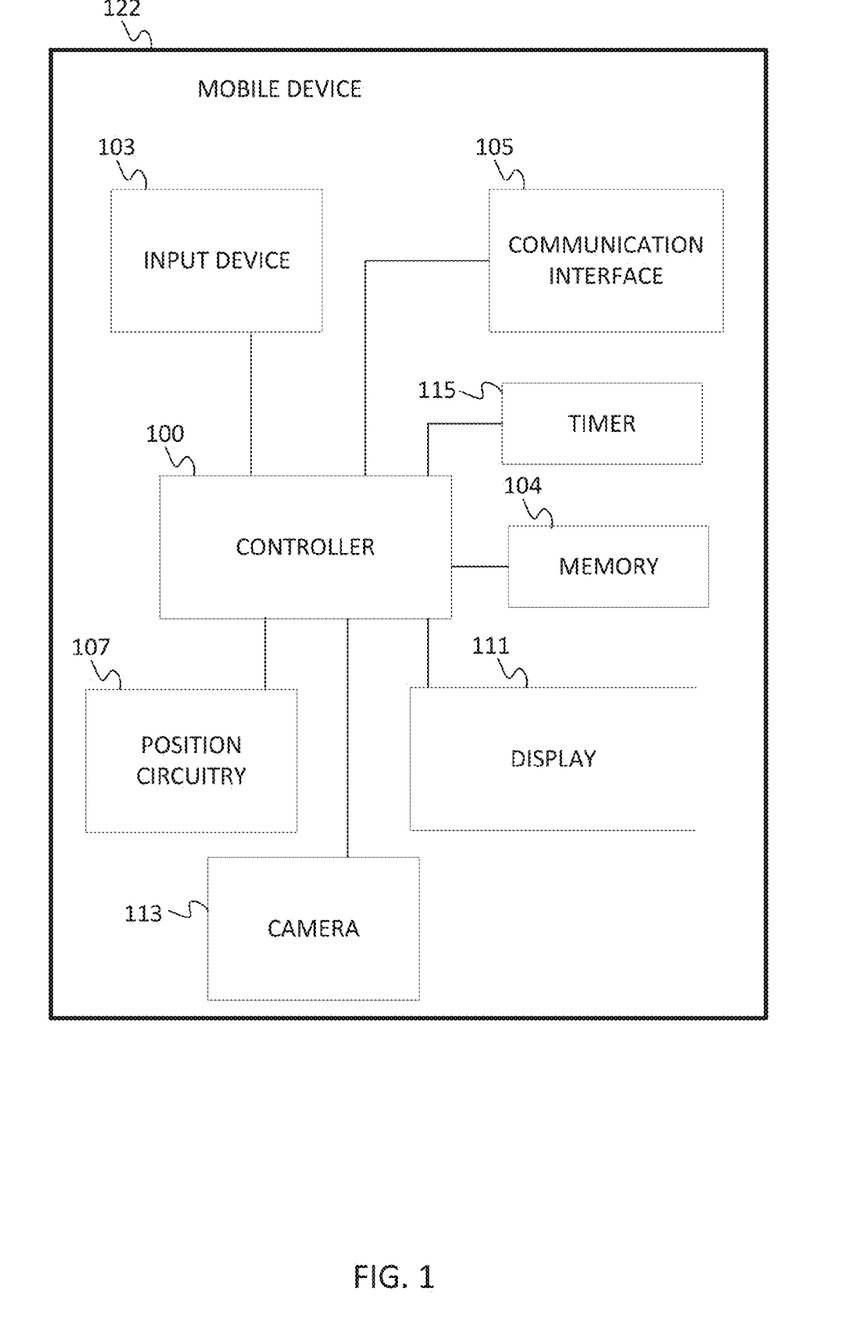
FIG. 1 illustrates an exemplary mobile device for variable rate image capture.

FIG. 1 illustrates an exemplary mobile device. The mobile device 122 is a smart phone, a camera, a connected camera, a mobile phone, a personal digital assistant ("PDA"), a tablet computer, a notebook computer, a personal navigation device ("PND"), and/or any other known or later developed portable or mobile computing device. A connected camera is any device capable of capturing images and communicating over a network. The connected camera may omit cellular connectivity but include another wireless communication technique such as the protocols known as Wi-Fi, the protocols defined by the IEEE 802.11 standards, the protocols defined by the Bluetooth standards, or other protocols. The communication may include signals or data packets through a network.

The mobile device 122 includes a controller 100 coupled with one or more of a memory 104, an input device 103, a communication interface 105, position circuitry 107, a camera 113, a timer 115, and a display 111. The phrase "coupled with" includes directly connected to or indirectly connected through one or more intermediate components. Such intermediate components may include hardware and/or software-based components. Additional, different, or fewer components may be provided, such as a mobile device 122 without position circuitry 107 and/or a communication interface 105.

The mobile device 122 collects image data through camera 113. The image data may be a series of photographs. The input device 103 receives a user input to begin recording or initiate a collection of image data by the mobile device 122. The user input may also indicate that the mobile device 122 should enter a time lapse mode.

The time lapse mode automatically selects a frame rate. The timer 115 is incremented in response to the collection of image data. The timer 115 indicates a duration of the recording. As the duration of the recording increases, the controller 100 compares the duration to thresholds, and the frame rate of the recording is changed as the duration reaches the thresholds. The frame rate of the recording may be increased or decreased depending on user preference. The change in frame rate may be discrete or continuous. The ratio of the elapsed time of the timer to the frame rate may be as constant as possible given available frame rates. The current frame rate may be inversely related to the recently passed time threshold. The timer 115 may be an intervalometer or another type of camera trigger.

In one implementation, the frame rate is decreased at specific thresholds for the time duration. For example, a capture frame rate of 30 frames per second may be used until the duration reaches a threshold of 6 seconds, a capture frame rate of 15 frames per second may be used from the duration of 6 seconds until the next threshold of 12 seconds, a capture frame rate of 5 frames per second may be used from the duration of 12 seconds until the next threshold of 36 seconds, and a capture frame rate of 1 frame per second until the next threshold of 6 minutes. The thresholds may be set so that the total recording has a predetermined maximum number of frames. The maximum number of frames may be any value such as 180 frames, 360 frames, 2080 frames, or 1800 frames. At a constant playback speed, the time for playback of the total recording does not exceed this maximum number of frames, regardless of the duration of the recording because only the frames of the final frame rate are used in playback. The total recording may vary from half of the maximum number of frames to the maximum number of frames for all possible recording durations depending on when the recording is stopped. As the recording duration increases, earlier frames may be deleted or not used.

Figure 2A:
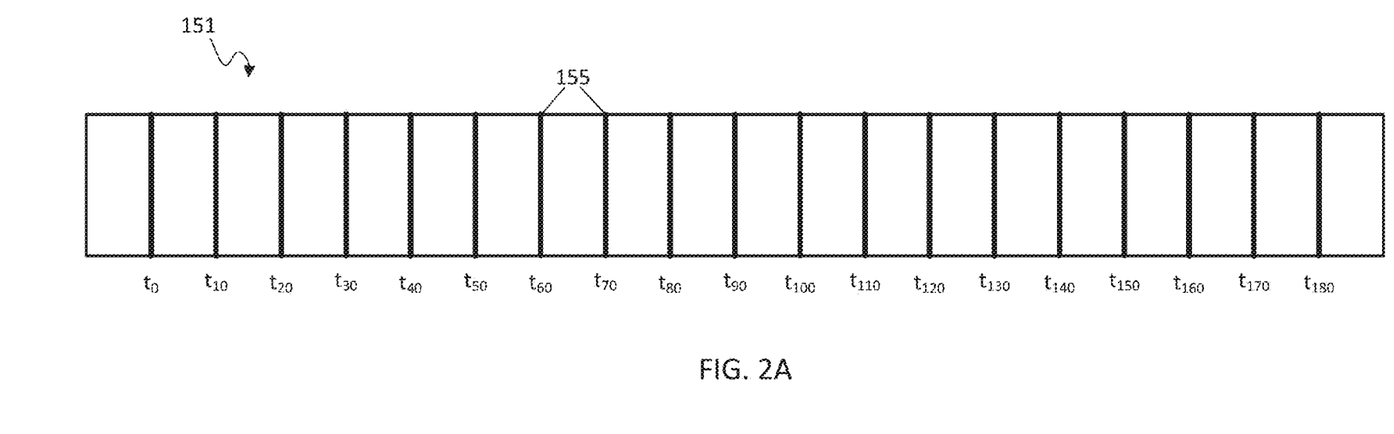
FIG. 2A illustrates an example timing chart for constant frame rate in time lapse photography.
Figure 2B:
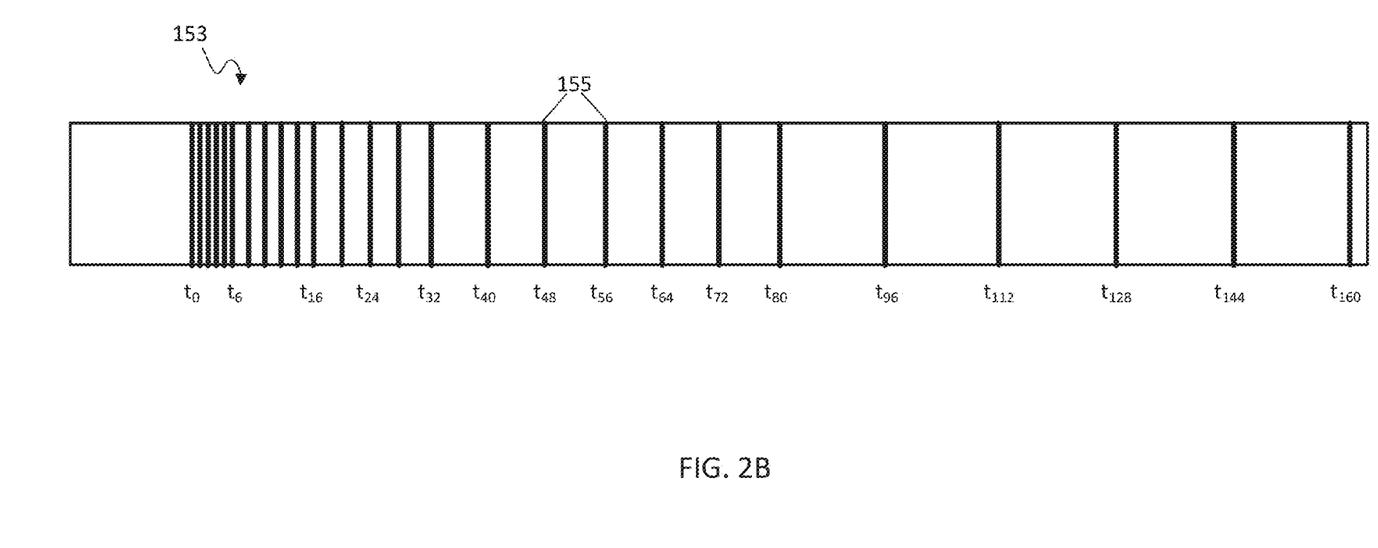
FIG. 2B illustrates an example timing chart for variable frame rate in time lapse photography.

FIG. 2A illustrates an example timing chart 151 for constant image capture frame rate in time lapse photography. The constant frame rate captures an image 155 every 10 time intervals (e.g., $t_0$, $t_{10}$, $t_{20}$, and so on). Assuming a playback speed of 24 frames per second, the eighteen images in FIG. 2A may be played in 0.75 seconds. FIG. 2B illustrates an example timing chart 152 for variable frame rate in time lapse photography. An image is captured every time interval until time $t_6$. From time $t_6$ to time $t_{16}$, an image is captured every other time interval. From time $t_{17}$ to $t_{32}$, an image is captured every fourth time interval. From time $t_{33}$ to $t_{80}$, an image is captured every eighth time interval. From time $t_{81}$ to $t_{160}$, an image is captured every sixteenth time interval. As shown in FIG. 2B, an amount of time between successive captured images increases as a step function with a size of the step increasing over time. The time interval may be any increment of time such as 1 second, 2 seconds, 100 milliseconds, or 10 milliseconds.

Figure 3:
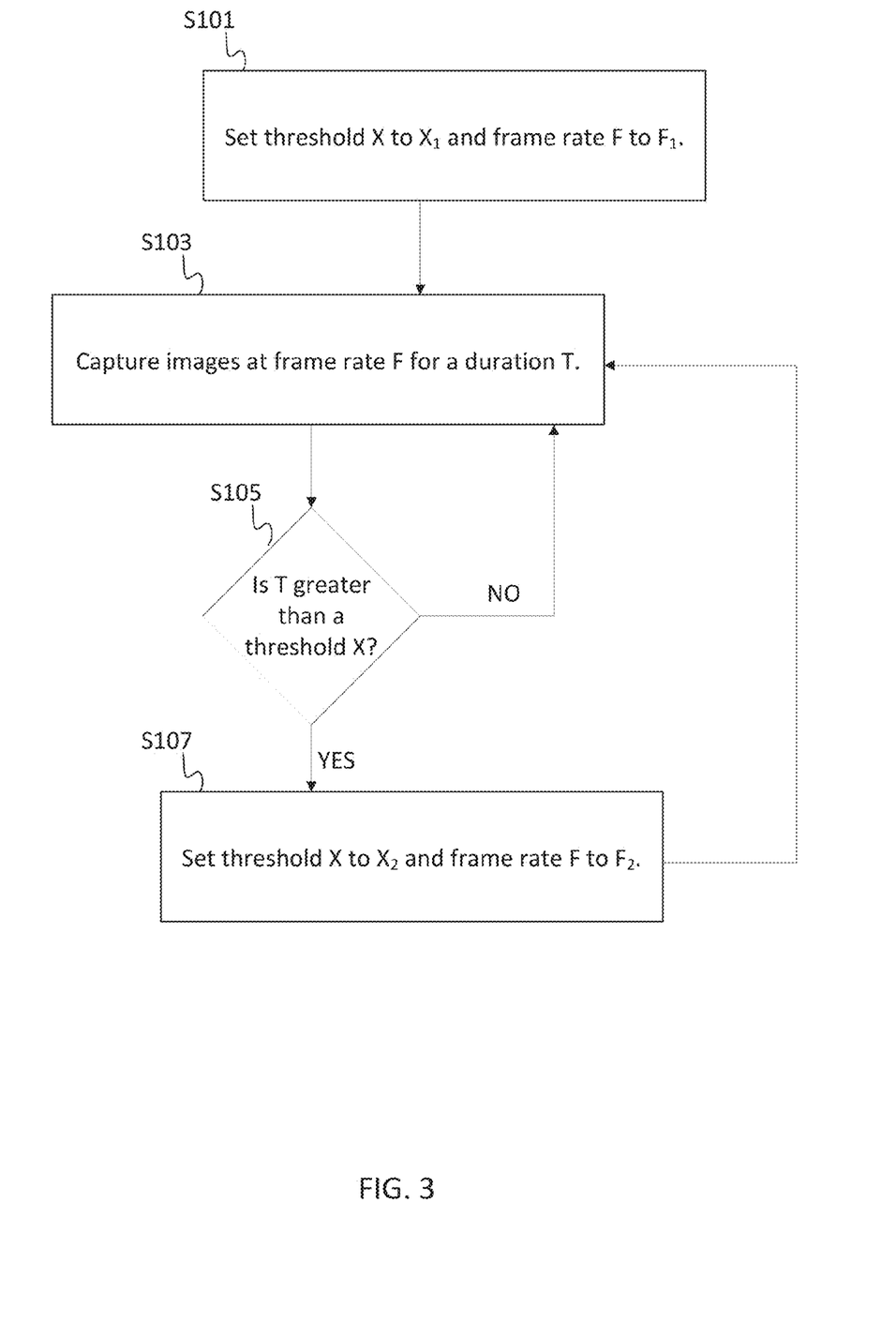
FIG. 3 illustrates an example flow chart for variable frame rate in time lapse photography.

FIG. 3 illustrates an example flow chart for variable frame rate in time lapse photography. The acts of the flow chart may be performed by the mobile device 122. At act S101, the algorithm is initialized by setting the threshold X to an initial threshold value $X_1$ and the frame rate F to an initial frame rate $F_1$.

At act S103, the mobile device 122 captures images at the frame rate F for a duration T that increases in value over time. The time duration is monitored at act S105. To monitor the time duration, the mobile device 122 may periodically or continuously compare the time duration T to the threshold X. When the time duration T is less than the threshold X, the algorithm returns to act S103.

When the time duration T is greater than the threshold X, the mobile device sets a new frame rate (e.g., $F_2$) and a new threshold (e.g., $X_2$), as shown in act S107. The algorithm returns to act S103. Acts 103-107 may be repeated any number of times using successive frame rates and thresholds. The set of thresholds and frame rates may be stored in a configuration file.

The configuration file may include multiple sets of capture frames rates and thresholds depending on a total number of frames or a total playback time. Table 1 includes data for an example configuration file. The columns of table 1 each describe a different desired total playback time. The rows of table 1 describe the thresholds. The mobile device 122 may include a time lapse mode with a total playback duration setting selected by the user. The mobile device 122 loads the configuration file and selects a column according to the total duration setting.

TABLE 1

| For maximum 6 second result changes at duration: | For max 12 second result changes at duration: | For max 24 second result changes at duration: | For max 48 second result changes at duration: | Time between frames changes to: |
| --- | --- | --- | --- | --- |
| 00:00:00 (hours: minutes: seconds) | 00:00:00 (hours: minutes: seconds) | 00:00:00 (hours: minutes: seconds) | 00:00:00 (hours: minutes: seconds) | 1/30 second |
| 00:00:06 | 00:00:12 | 00:00:24 | 00:00:48 | 1/15 second |
| 00:00:12 | 00:00:24 | 00:00:48 | 00:01:36 | 1/3 second |
| 00:00:36 | 00:01:12 | 00:02:24 | 00:04:48 | 1 second |
| 00:06:00 | 00:12:00 | 00:24:00 | 00:48:00 | 2 seconds |
| 00:12:00 | 00:24:00 | 00:48:00 | 01:36:00 | 4 seconds |
| 00:24:00 | 00:48:00 | 01:36:00 | 03:12:00 | 8 seconds |
| 00:48:00 | 01:36:00 | 03:12:00 | 06:24:00 | 16 seconds |

Figures 4A, 4B:
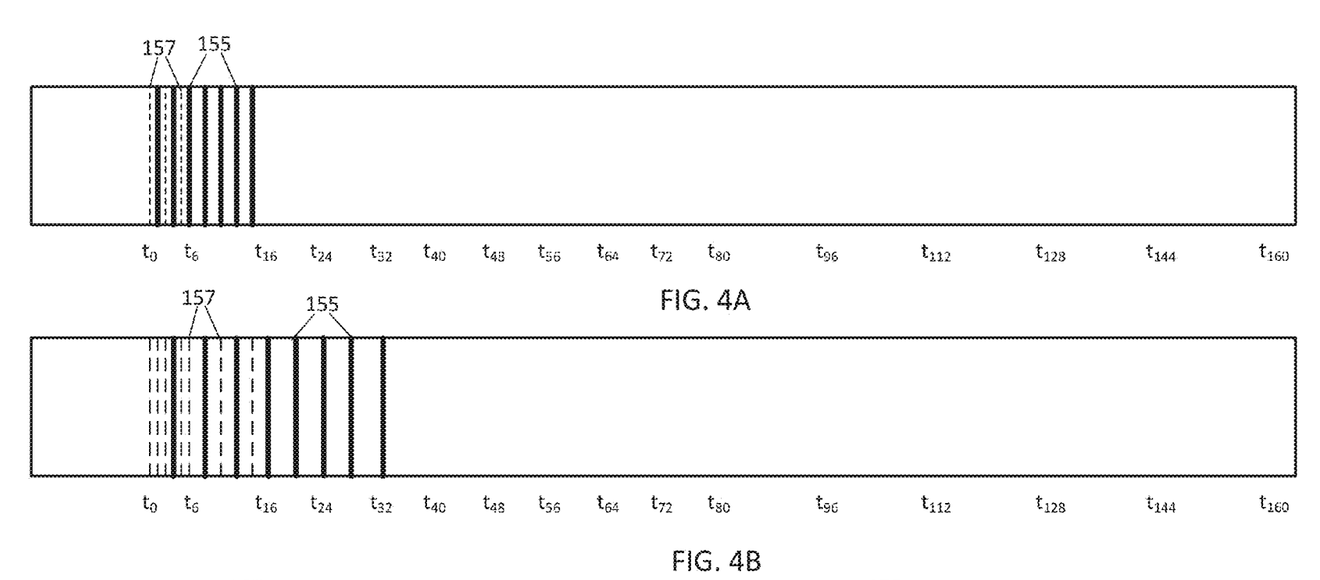
FIGS. 4A-C illustrate example timing charts for frame removal in time lapse photography.
Figure 4C:
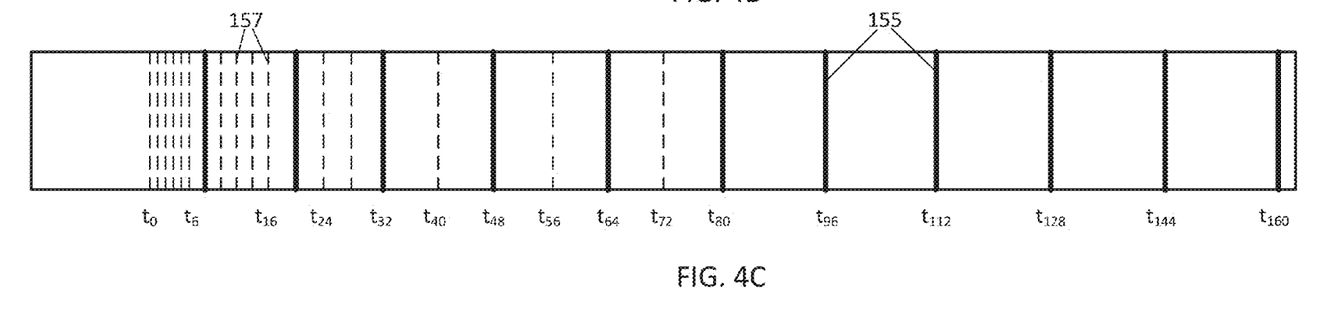

FIGS. 4A-C illustrate example flow charts for frame removal in time lapse photography. In the example of FIG. 4A, the mobile device 122 has collected image captures at every time interval from $t_0$ to $t_6$ and every other time interval from $t_6$ to $t_{15}$. Once the recording passes the threshold at $t_6$, only half of the images captured between $t_0$ to $t_6$ are needed to play back the recording. Therefore, some of the images 157 may be deleted from the mobile device. The images may be deleted in response to passing the next threshold or when the collection of image data stops. The deleted images 157 were captured at a first rate when the mobile device 122 enters a second rate for image capture. FIG. 4B further illustrates more deleted images 157 when the recording extends to $t_{31}$, and FIG. 4C further illustrates even more deleted images 157 when the recording extends to $t_{160}$. While recording, the mobile device may write over the locations in memory freed up from the deleted images 157 with new image captures.

In one embodiment, the mobile device 122 may capture images at a constant frame rate (e.g., 24 frames per second, 30 frames per second, or another value). When the recording is stopped, the mobile device 122 deletes the unnecessary image captures to obtain the desired playback duration.

The set of frame rates for image capture may be successive multiples of one another (e.g., 32 frames per second, 16 frames per second, 8 frames per second, 4 frames per second, and so on). However, the differences between adjacent frame rates may be uneven (e.g., 30 frames per second, 20 frames per second, 15 frames per second, 10 frames per second, and so on). With uneven gaps between frame rates, the images needed from the first frame rate to complete the second frame rate may not be available. For example, consider an example with the first frame rate at 30 frames per second and the second frame rate at 20 frames per second. The last image capture during the first frame rate cannot be used once the recording switches to the second capture frame rate. Instead, an image that would have occurred between the last two images captures in the first rate is needed. Interpolation may be used to simulate the image that would have occurred. In other words, when a frame rate is not a multiple of an earlier frame rate, to maintain equal timing, the mobile device 122 may interpolate new images. The interpolation may include weighted averages of pixel values between the two closest image captures. The interpolation may be an averaged value or a prorated value for color, brightness, hue, intensity, or another image property.

The positioning circuitry 107 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 107 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

In one embodiment, a frame rate is selected based on the location of the mobile device 122. The selection of the frame rate based on location may be made alone or in combination with a frame rate that varies over time as described above. For example, the frame rate based on location may be a temporary frame rate selected when a change in the location of the mobile device 122 exceeds a location threshold. In another example, the sequence of frame rates discussed above may be reset (e.g., return to the initial frame rate) when a change in the location of the mobile device 122 according to (e.g., exceeding or falling below) a location threshold occurs. Examples for the location thresholds include 1 meter, 10 meters, 100 meters, or any distance.

Consider a scenario where the mobile device is mounted on a car, a bicycle, or a person to record a trip. During the trip, different frame rates may be advantageous depending on preferences of a user. For example, the user may desire a low frame rate (e.g., 1 frame per minute) as the car travels down the highway and a much faster frame rate (e.g., 1 frame per second) when the car stops at a lookout point. In another example, the user may desire the frame rate to go lower when the car stops because stops are associated with uneventful points of the trip (e.g., stopping for lunch, stopping for gas, etc.).

In another example, the speed of the mobile device 122 may be a general indication of how often an image should be captured. For example, during a road trip, the mobile device 122 may experience a wide range of speeds depending on the type of road, traffic, weather, and other factors. In one example, more images are captured in areas that the mobile device 122 is moving slowly and fewer images are collected in areas that the mobile device 122 is moving quickly because more interesting subject matter may occur when the speed is slowed. Alternatively, the user may desire the playback of the recording to be equally spaced over distance rather than the actual speed that the mobile device 122. To achieve this, the frame rate may be set to be proportional to the speed of the mobile device 122. A frame collection rate may be one image capture every 100 meters. When the mobile device 122 is moving 100 meters per second, the frame rate is calculated a 1 frame per second, but when the mobile device 122 is moving at 200 meters per second, the frame rate is calculated as 2 frames per second.

The change in location of the mobile device 122 may trigger a reset in the sequence of frame rates. For example, when the car, bicycle, or person stops moving to watch wildlife, a fire, or other interesting subject matter, the user may wish to reset the frame rate to a higher rate that is more suited to capture the action. The recording may continue at the higher rate until the change in location of the mobile device 122 surpasses a threshold or the recording may continue at decreasing frame rates as described above.

The frame rate may also be controlled based on when the mobile device 122 approaches, becomes near, or arrives at a particular address, point of interest, or specific geographic coordinates. The mobile device 122 monitors location data received from the position circuitry 107. The location data may be compares to a target location (e.g., a destination) or list of locations. For example, the mobile device 122 may defined a radius around the target location. When the mobile device 122 is within the radius, the frame rate is changed. The frame rate may be increased so that more images of the particular addresses, point of interest, or geographic coordinates. Alternatively, the frame rate may be decreased so fewer images of the target location.

In one embodiment, the location based thresholds may be an alternative to the time thresholds above. The location based thresholds may have units of distance or speed. The mobile device 122 may be configured to begin collecting image data with the camera 113 in response to a user input at an initial frame rate. The position circuitry 107 detects the position of the mobile device 122, which compares the position or speed of the mobile device 122 to a threshold position or speed, when the threshold is exceeded, the camera 113 collects data at another frame rate. The other frame rate is different than the initial frame rate and may be greater or less than the initial frame rate. Additional location based thresholds and frame rates may be included.

Figure 5:
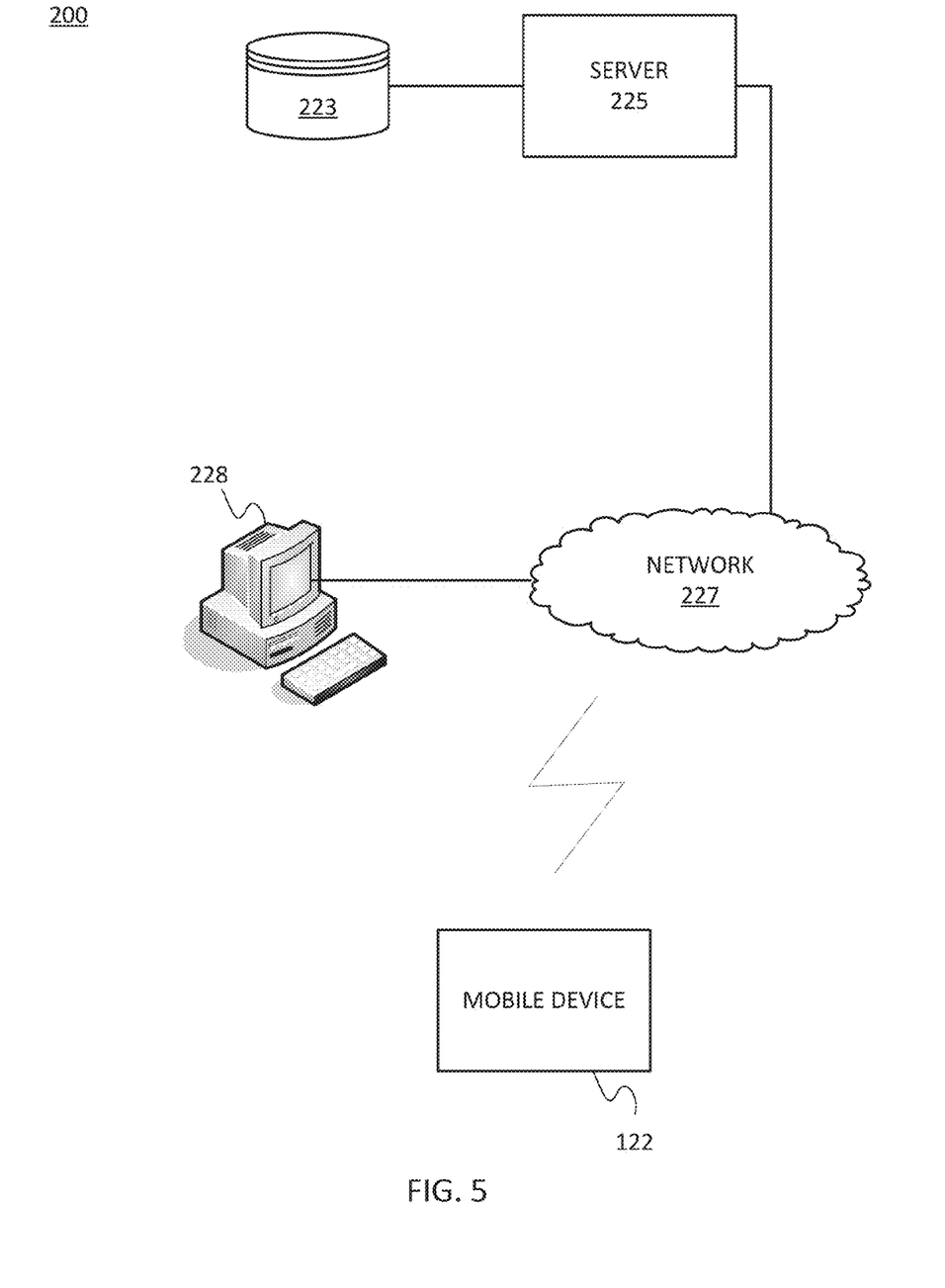
FIG. 5 illustrates an example system for automatic image capture for time lapse photography.
Figure 6:
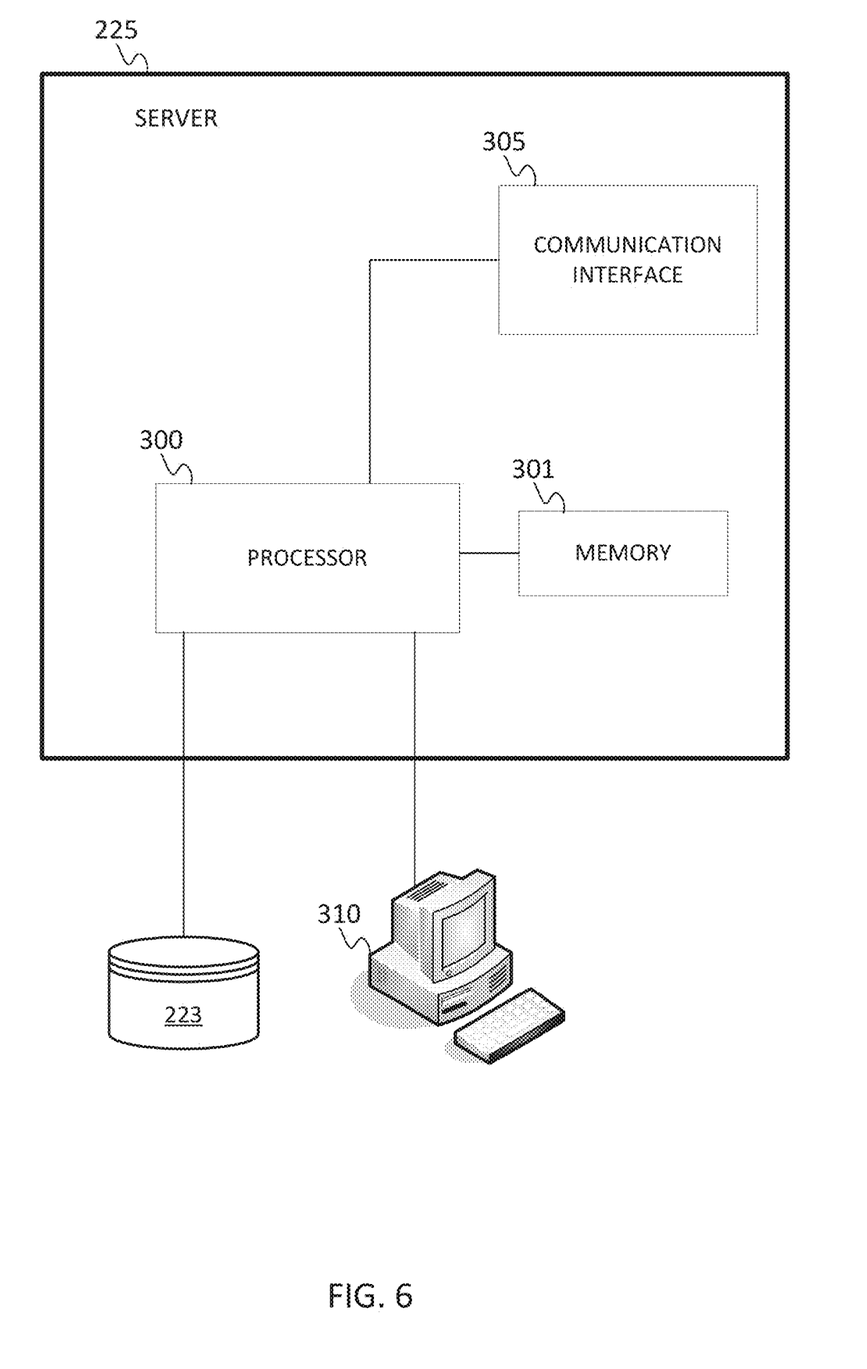
FIG. 6 illustrates an exemplary server of the system of FIG. 5.

FIG. 5 illustrates an example system 200 for automatically selecting a frame rate for the image capture. The system 200 includes a server 225, a database 223, a mobile device 122, a workstation 228, and a network 227. Additional, different, or fewer components may be provided. For example, many mobile devices 122 may connect with the network 227 and the server 225. FIG. 6 illustrates an exemplary server 225 of the system of FIG. 5. The server 225 includes a processor 300, a communication interface 305, and a memory 301. The server 225 may be coupled to a database 223 and a workstation 310. The workstation 310 may be used as an input device for the server 225. In addition, the communication interface 305 is an input device for the server 225. The communication interface 305 receives data indicative of user inputs made via the workstation 228 or the mobile device 122.

As described above, a majority or all of the processing may occur at the mobile device 122. Alternatively, a majority of the processing may occur at the server 225 and the mobile device 122 primarily captures images under the direction of the server 225. For example, the memory 301 is configured to store frame rates for collecting image data and store time thresholds for switching between frame rates. The processor 300, which may be any type of controller, is configured to select a high frame rate initially for a collection of image data. The high frame rate may be any value. Examples include 10 frames per second and 30 frames per second. The high frame rate may be selected as a speed that creates the illusion of motion to the human eye and brain. The processor 300 is configured to generate a command for the mobile device 122 including the high frame rate. The mobile device collects image data (e.g., a sequence of still images) at the high frame rate in response to the command.

The processor 300 is configured to monitor an elapsed time of the collection of image data and compare the elapsed time to a time threshold. When the elapsed time meets or exceeds the time threshold, the processor 300 generates a new command for the mobile device 122 including a low frame rate. The low frame rate may be any value that is lower that the high frame rate. Example low frame rates include 5 frames per second and 20 frames per second.

The processor 300 may continue to monitor the elapsed time of the collection image data and compare the elapsed time to addition time thresholds. Additional, commands are generated and sent to the mobile device 122 as the elapsed collection time exceeds the thresholds. In one example, the frame rates are inversely proportional to the time thresholds. As the time threshold is greater, the subsequent frame rate is lower. In addition, the product of the time threshold and the subsequent frame rate may be constant or within a range.

Figure 7:
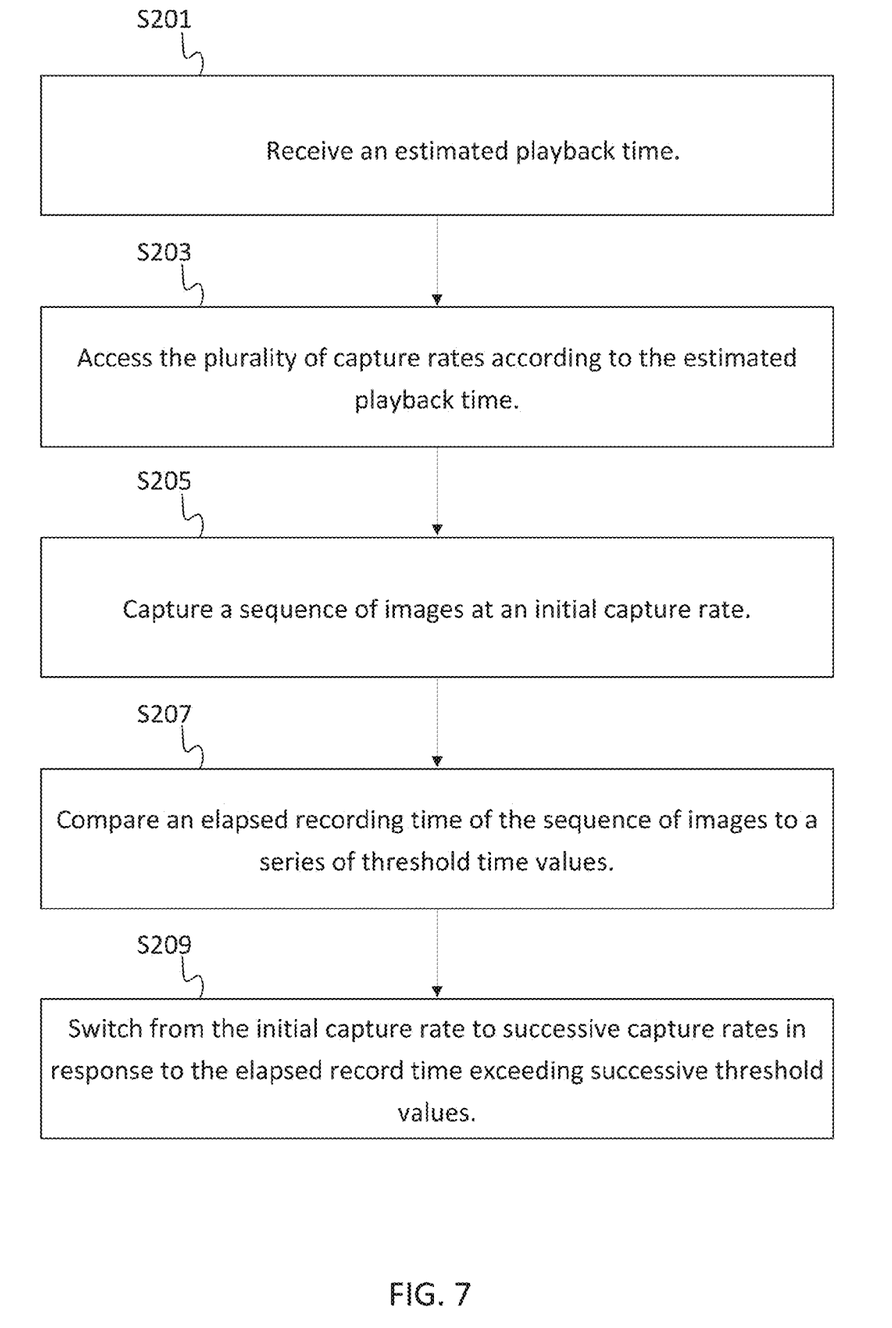
FIG. 7 illustrates another example flowchart for the automatic frame rate setting in time lapse photography.

FIG. 7 illustrates an example flowchart for the automatic frame rate setting in time lapse photography, which is described in relation to the mobile device 122 but may be performed by another device. Additional, different, or fewer acts may be provided.

At act S201, the mobile device 122 receives an estimated playback time. The playback time may be statically set by the time lapse mode. The playback time may be received by a user setting. Example playback times include 30 seconds, 1 minute, 2 minutes, and 10 minutes. The playback time may be adjusted to a nearest one of the possible predefined playback times. Regardless of the recording time, the mobile device 122 is configured to adjust frame rates to arrive at the same playback time.

For each possible playback time, a set of capture rates are stored in memory. Alternatively, a set of capture rates may be calculated based on the playback time. In either scenario, at act S203, the mobile device 122 accesses the plurality of capture rates according to the estimated playback time. Acts S201 and S203 may be omitted.

At act S205, the mobile device 122 captures a sequence of images at an initial capture rate of the plurality of capture rates. The initial capture rate may be sufficient to approximate real time motion.

At act S207, the mobile device 122 compares an elapsed recording time to a series of threshold time values. The first of the series of threshold time values may be based on the attention span of the viewer. For example, typical attention span may be 1 minute. Alternatively, the mobile device may record data related to the viewer's habits (e.g., when watching videos does the viewer often click away). Thus, the first threshold time value or the series of threshold time values may be based on viewer habits.

At act S209, the mobile device 122 switches from an initial capture rate of the plurality of capture rates to a subsequent capture rate in response to the elapsed recording time exceeding one of the series of threshold values. The series of threshold values may be equally spaced, logarithmically spaced, or exponentially spaced. As the elapsed recording time meets or exceeds the next threshold value, the mobile device 122 begins recording at the next capture rate. By repeating act S209 at multiple capture rates and discarding captured frames not needed for the final rate, the playback time remains substantially constant, regardless of the length of the recording time. The term "substantially constant" means within a percentage variation of a constant value. Example percentage variations include 1%, 2%, 5% and 10%.

The input device 103 is configured to receive a selection for the playback duration and an instruction to begin recording. The input device 103 may be one or more buttons, keypad, keyboard, mouse, stylist pen, trackball, rocker switch, touch pad, voice recognition circuit, or other device or component for inputting data to the mobile device 122. The input device 103 and the display 111 may be combined as a touch screen, which may be capacitive or resistive. The display 111 may be a liquid crystal display (LCD) panel, light emitting diode (LED) screen, thin film transistor screen, or another type of display.

The controller 100 and/or processor 300 may include a general processor, digital signal processor, an application specific integrated circuit (ASIC), field programmable gate array (FPGA), analog circuit, digital circuit, combinations thereof, or other now known or later developed processor. The controller 100 and/or processor 300 may be a single device or combinations of devices, such as associated with a network, distributed processing, or cloud computing.

The memory 104 and/or memory 301 may be a volatile memory or a non-volatile memory. The memory 104 and/or memory 301 may include one or more of a read only memory (ROM), random access memory (RAM), a flash memory, an electronic erasable program read only memory (EEPROM), or other type of memory. The memory 104 and/or memory 301 may be removable from the mobile device 122, such as a secure digital (SD) memory card.

The communication interface 105 and/or communication interface 305 may include any operable connection. An operable connection may be one in which signals, physical communications, and/or logical communications may be sent and/or received. An operable connection may include a physical interface, an electrical interface, and/or a data interface. The communication interface 105 and/or communication interface 305 provides for wireless and/or wired communications in any now known or later developed format.

The network 227 may include wired networks, wireless networks, or combinations thereof. The wireless network may be a cellular telephone network, an 802.11, 802.16, 802.20, or WiMax network. Further, the network 227 may be a public network, such as the Internet, a private network, such as an intranet, or combinations thereof, and may utilize a variety of networking protocols now available or later developed including, but not limited to TCP/IP based networking protocols.

The memory 104, the database 123, or the memory 301 may be a computer readable medium or a non-transitory computer readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
receiving a user input to initiate a collection of image data by a mobile device;
incrementing a timer in response to the collection of image data;
receiving location data for the mobile device;
selecting a first frame rate based on the location data;
capturing the image data at the first frame rate;
comparing the timer to a time threshold; and
capturing the image data at a second frame rate when the timer exceeds the time threshold.

2. The method of claim 1, wherein the second frame rate is inversely related to the time threshold.

3. The method of claim 1, further comprising:
comparing the timer to a second threshold; and
capturing the image data at a third frame rate when the timer exceeds the second threshold.

4. The method of claim 1, further comprising:
removing at least one frame of image data captured at the first frame rate when the timer exceeds the threshold or when the collection of image data stops.

5. The method of claim 1, wherein the second frame rate multiplied by the threshold equals a predetermined value.

6. The method of claim 1, wherein the user input specifies an amount of time for a playback of the image data.

7. The method of claim 1, further comprising:
interpolating between pixel values of the image data.

8. The method of claim 1, further comprising:
comparing a change in the location data to a location threshold; and
capturing the image data at a temporary frame rate when the change in the location data exceeds the location threshold.

9. The method of claim 1, further comprising:
capturing the image data at a temporary frame rate proportional to a change in the location data.

10. An apparatus comprising:
positioning circuitry configured to determine a location of the apparatus;
a memory configured to store a plurality of frame rates for collecting image data and store at least one time threshold; and
a controller configured to select a high frame rate from the plurality of frame rates based on the location of the apparatus initially for a collection of image data and monitor an elapsed time of the collection of image data,
wherein the controller is configured to select a lower frame rate from the plurality of frame rates when the elapsed time of the collection of image data exceeds the at least one time threshold.

11. The apparatus of claim 10, wherein the lower frame rate is inversely proportional to the at least one time threshold.

12. The apparatus of claim 10, wherein the controller is configured to delete at least one frame of image data captured at the high frame rate after the lower frame rate is selected.

13. The apparatus of claim 10, wherein the lower frame rate multiplied by the at least one time threshold equals a predetermined number of frames.

14. The apparatus of claim 10, wherein the controller is configured to interpolate between pixel values between successive frames of image data.

15. The apparatus of claim 10, wherein the controller is configured to select a temporary frame rate for capturing the image data when a change in the location of the apparatus exceeds a location threshold.

16. The apparatus of claim 10, wherein the controller is configured to capture the image data at a temporary frame rate proportional to a change in the location of the apparatus.

17. A non-transitory computer readable medium including instructions executable on a device, the instructions comprising instructions for:
receiving location data for the device;
capturing a sequence of images at an initial capture rate selected from a plurality of capture rates based on the location data;
comparing an elapsed recording time of the sequence of images to a series of threshold time values; and
switching from the initial capture rate of the plurality of capture rates to successive capture rates of the plurality of capture rates in response to the elapsed recording time exceeding successive threshold values of the series of threshold values.

18. The non-transitory computer readable medium of claim 17, the instructions including instructions for:
deleting at least one image of the sequence of images captured at the initial capture rate in response to the elapsed recording time exceeding one of the series of threshold values.

19. The method of claim 1, further comprising:
resetting to the first frame rate in response to the location data exceeding a location threshold.

* * * * *